United States Patent
Von Berg et al.

(10) Patent No.: US 7,957,572 B2
(45) Date of Patent: Jun. 7, 2011

(54) IMAGE PROCESSING DEVICE AND METHOD

(75) Inventors: Jens Von Berg, Hamburg (DE); Cristian Lorenz, Hamburg (DE)

(73) Assignee: Koninklijke Philips Electronics N.V.

( * ) Notice: Subject to any disclaimer, the term of this patent is extended or adjusted under 35 U.S.C. 154(b) by 830 days.

(21) Appl. No.: 11/815,597

(22) PCT Filed: Feb. 8, 2006

(86) PCT No.: PCT/IB2006/050403
§ 371 (c)(1),
(2), (4) Date: Aug. 6, 2007

(87) PCT Pub. No.: WO2006/085268
PCT Pub. Date: Aug. 17, 2006

(65) Prior Publication Data
US 2008/0205716 A1  Aug. 28, 2008

(30) Foreign Application Priority Data
Feb. 11, 2005  (EP) ..................................... 05101009

(51) Int. Cl.
*G06K 9/00* (2006.01)
*G06T 15/00* (2006.01)
(52) U.S. Cl. ......................... 382/128; 382/154; 345/419
(58) Field of Classification Search .................. 382/128, 382/129, 130, 131, 132, 133, 134, 154, 168, 382/173, 181, 203, 219, 232, 260, 274, 275, 382/276, 305; 703/2; 345/419; 378/4, 21
See application file for complete search history.

(56) References Cited

U.S. PATENT DOCUMENTS
7,274,810 B2 * 9/2007 Reeves et al. ................. 382/128
(Continued)

FOREIGN PATENT DOCUMENTS
WO  2004053792 A1  6/2004
(Continued)

OTHER PUBLICATIONS
Chen, C. W., et al.; CT Volumetric Data-based Left Ventricle Motion Estimation: An Integrated Approach; 1995; Computerized Medical Imaging and Graphics; 19(1)85-100.
(Continued)

*Primary Examiner* — Seyed Azarian

(57) ABSTRACT

The present invention relates to an image processing device and a corresponding image processing method for processing a multi-dimensional data set of image data, in particular of three-dimensional medical volume image data, including a segmentation unit (6, 16, 26) for a segmentation of an image object in said data set. Further, the present invention relates to a computer program for implementing said image processing method on a computer. In order to allow for a segmentation which is robust in terms of vulnerability to image artifacts and accurate in terms of reflecting anatomical details, wherein the results of the segmentation are achieved within reasonable short processing time an image processing device is proposed which comprises—model-based segmentation means (61, 161, 261) for performing a model-based segmentation (32) of said data set for obtaining a multi-dimensional model representing a first approximation of said image object; data-driven segmentation means (62, 162, 262) for performing a data-driven segmentation (33) of said multi-dimensional data set for obtaining a multi-dimensional subset of said multi-dimensional data set representing a second approximation of said image object; optimizing means (63, 163, 263) for adapting said model and/or said subset for optimizing a similarity value between said first and said second approximation; and —selecting means (64, 164, 264) for selecting said adapted model or said adapted subset as a segmentation of said image object.

17 Claims, 16 Drawing Sheets

U.S. PATENT DOCUMENTS

| | | | | |
|---|---|---|---|---|
| 2002/0172406 | A1* | 11/2002 | Rouet et al. | 382/128 |
| 2006/0098007 | A1* | 5/2006 | Rouet et al. | 345/419 |
| 2006/0126922 | A1* | 6/2006 | Von Berg et al. | 382/154 |
| 2006/0149511 | A1* | 7/2006 | Kaus et al. | 703/2 |

FOREIGN PATENT DOCUMENTS

| | | |
|---|---|---|
| WO | 2004063987 A1 | 7/2004 |
| WO | 2004063988 A1 | 7/2004 |

OTHER PUBLICATIONS

Loncaric, S., et al.; 3-D deformable model for aortic aneurysm segmentation from CT images; http://www.ipg.zesoi.fer.hr/papers/wc00an.pdf downloaded Sep. 15, 2004.

Lorensen, W. E.; Marching Cubes: A High Resolution 3D Surface Contruction Algorithm; 1987; Proc. SIGGRAPH; pp. 163-169.

Lorenzo-Valdes, M., et al.; Atlas-Based Segmentation and Tracking of 3D Cardiac MR Images Using Non-rigid Registration; 2002; Proc. of MICCAI; pp. 642-650.

Marom, E. M., et al.; Variations in Pulmonary Venous Drainage to the Left Atrium: Implications for Radiofrequency Ablation; 2004; Radiololgy; 230(3)824-829.

McInerney, T., et al.; Deformable models in medical image analysis: a survey; 1996; Medical Image Analysis; 1(2) 91-108.

Pilgram, R., et al.; Modeling of the geometric variation and analysis of the right atrium and right ventricle motion of the human heart using PCA; 2004; International Congress Series; 1108-1113.

Suri, et al. (Eds.) Advanced Algorithmic Approaches to Medical Image Segmentation-Section 3.3 Low-and Medium-Level LV Segmentation Techniques; 2002; pp. 144-154.

Suri, et al. (Eds.) Advanced Algorithmic Approaches to Medical Image Segmentation-Section 3.4 Model-Based Pattern Recogntion Methods for LV Modeling; 2002; pp. 154-190.

Timinger, H., et al.; Integration of Interactive Corrections to Model-Based Segmentation Algorithms; Proc. Bildverabeitung fuer die Medizin; 11-15.

Von Berg, J., et al.; Accurate left atrium segmentation in multislice CT images using a shape model; Proc. of SPIE; 2005; vol. 5747; pp. 351-360.

Weese, J., et al.; Shape Constrained Deformable Models for 3D Medical Image Segmentation; 2001; Proc. IPMI; pp. 380-387.

Kaus et al: "Automated Segmentation of the Left Ventricle in Cardiac MRI"; Medical Image Analysis, 2004, vol. 8, pp. 245-254.

* cited by examiner

IMAGE PROCESSING DEVICE AND METHOD

The present invention relates to an image processing device and a corresponding image processing method for processing a multi-dimensional data set of image data, in particular of three-dimensional medical volume image data, including a segmentation unit for a segmentation of an image object in said data set. Further, the present invention relates to a computer program for implementing said image processing method on a computer.

In medical imaging different medical imaging modalities are available to provide image data of a region of interest of a patient's body. For instance, X-ray, computer tomography and magnetic resonance imaging are available to assess the condition of the coronary vasculature. Depending on the desired use of such image data, the imaged region of interest and other requirements it is often needed to segment a target organ or, more generally, a target image object from the medical image data, in particular from medical volume image data, wherein it is desired that the segmentation may be performed automatically by a computer without a need for extensive supervision or assistance by a human user.

In the following—for the purpose of a better understandability—the description will be focused on the processing of cardiac structures. However, it has to be noted that the invention is not limited to processing of only cardiac structures. Any kind of multi-dimensional image data may be segmented according to the invention, including medical and non-medical image data, two-dimensional image data like common pictures, three-dimensional image data like volume image data or a temporal sequence of two-dimensional image data, four-dimensional image data like a temporal sequence of volume image data, and even higher-dimensional image data.

Several different methods have been proposed for segmentation. These methods may in general be grouped into two categories: model-based segmentation and data-driven segmentation.

For a model-based segmentation and labeling of cardiac structures prior knowledge is mandatory. Statistical shape models typically capture the shape properties of a training set of target objects. Active shape models that make use of these priors have been used already to segment cardiac chambers in MR and echocardiographic image volumes. Comparably less work was done for multislice computed tomography (MSCT) images. Labelling of a number of target objects was done by non-rigid image-based registration of a labelled image (atlas) to the image of interest (cf. Lorenzo-Valdes, G. Sanchez-Ortiz, R. Mohiaddin, D. Ruckert. Atlas-based segmentation and tracking of 3D cardiac images using non-rigid registration. In: Proc. of MICCAI, 642-650, 2002), by joined adaptation of several models (cf. R. Pilgram, K. D. Fritscher, R. Schubert. Modeling of the geometric variation and analysis of the right atrium and right ventricle motion of the human heart using PCA. In: Proc. of CARS 1108-1113, 2004) or by an explicit compound model.

All these segmentation methods are not mainly intended to give an accurate border detection reflecting anatomical details, but rather capture the coarse extent of the target organ part. For this purpose only a small number of parameters (some tens to some thousands) are sufficient. This helps to keep this iterative adaptation process fast, but on the other hand restricts the accuracy achievable by all possible shape configurations. When choosing the right number of parameters for the model there is a trade-off between accuracy and generality. Often, a low number of parameters is favored in order to achieve shorter processing times.

In contrast to the (shape) model-based segmentation methods, there also exist methods less restricted by shape constraints. These data-driven methods utilize solely information included in the data itself. Examples for data-driven segmentation methods may be taken from "Low- and Medium-Level LV Segmentation Techniques", Section 3.3 in Suri, Setarehdan, Singh (Eds.) Advanced Algorithmic Approaches to Medical Image Segmentation, Springer, 2002.

For example, in contrast-medium enhanced multi-slice computed tomography (MSCT) images the blood pool in the left atrium and its pulmonary veins can easily be segmented by the application of a threshold for the Hounsfield values. This method reaches a resolution as fine as the voxel spacing, which is about 0.5 mm in cardiac MSCT images. Having no prior knowledge about the expected position or shape of the target, this method is not capable of reliably separating it from nearby structures that are also above the Hounsfield threshold. FIG. 1 gives an impression on such a segmentation. For the atrium these other structures are mainly the blood pool of the left ventricle and the coronaries. The pulmonary veins also come close to the pulmonary arteries, the descending aorta, and the spine.

Data-driven methods are not necessarily restricted by a number of parameters. Usually, either local boundary candidates are detected, or regions of similar voxels are pooled together. Thus, a high accuracy may potentially be reached in the data-driven segmentation result, but there is a vulnerability to image artifacts like noise, partial volume effects etc. Usually, data-driven methods find more boundary candidates than desired for a given object.

It is an object of the present invention to provide an image processing device and a corresponding image processing method which overcome the drawbacks of the known methods described above and allow for a segmentation which is robust in terms of vulnerability to image artifacts and accurate in terms of reflecting anatomical details, wherein the results of the segmentation are achieved within a reasonable, short processing time.

The object is achieved according to the present invention by an image processing device as claimed in claim 1, comprising:

model-based segmentation means for performing a model-based segmentation of said data set for obtaining a multi-dimensional model representing a first approximation of said image object;

data-driven segmentation means for performing a data-driven segmentation of said multi-dimensional data set for obtaining a multi-dimensional subset of said multi-dimensional data set representing a second approximation of said image object;

optimizing means for adapting said model and/or said subset for optimizing a similarity value between said first and said second approximation; and selecting means for selecting said adapted model or said adapted subset as a segmentation of said image object.

A corresponding image processing method is defined in claim 16. A computer program for causing a computer to carry out the steps of the image processing method according to the invention when said computer program is executed on a computer is defined in claim 17.

It has to be noted that the term "subset" is used herein to describe the result of the data-driven segmentation in general. The term "subset" does not only refer to a subset of said data set having substantially the same data structure as the data set, i.e. being a subset in a mathematical or literal sense, but also to any other result or output of the data-driven segmentation representing the image object or an approximation thereof, e.g. a iso-surface triangulation.

Further, the term "optimizing a similarity value" herein has the meaning of adapting said model and/or said subset in such a way that a desired similarity is achieved or that the similarity value is above or below a predetermined threshold value. The optimum of the similarity value does not have to be a similarity value corresponding to a sameness.

The present invention is based in the idea that a model-based segmentation and a data-driven segmentation may be performed on the same image data and the results of these segmentations may be used as first approximations of the image object to be segmented. The drawbacks described above are overcome by using both approximations wherein the specific advantages of either method are used to achieve a proper segmentation of the image object. The information derived from the data set of image data by either of the two methods may be used to improve the results of the respective other method.

Said model-based segmentation may include a mesh-based segmentation, a functional-approximation-based segmentation and/or combinations thereof and said data-driven segmentation may include a pixel-based segmentation, a boundary-based segmentation, a region-based segmentation, a texture-based segmentation, a watershed-segmentation and/or combinations thereof. Other known methods for segmentation may also be used as long as a comparison or measure of similarity between the respective results is possible.

In a preferred embodiment of the image processing device said data-driven segmentation means is adapted for using information derived by said model-based segmentation means from said model-based segmentation in said data-driven segmentation and/or said model-based segmentation means is adapted for using information derived by said data-driven segmentation means from said data-driven segmentation in said model-based segmentation. Said information derived from said model-based segmentation may preferably include starting values for said data-driven segmentation, threshold values for said data-driven segmentation and/or a region of interest for selecting a subsection of said data set for which said data-driven segmentation is to be performed. Similarly, said information derived from said data-driven segmentation may preferably include a region of interest for selecting a subsection of said data set for which said model-based segmentation is to be performed and/or estimations for position, orientation and/or size of said object as starting values for said model-based segmentation. Since the segmentation methods are applied to the same data set of image data the result of one kind of segmentation or approximation can be used as supporting data for the other kind. For example, once a model-based segmentation is completed and a model representing the image object is obtained, the model may be used for a coarse distinction between voxels of the object and voxels of the background. According to this distinction a threshold value, e.g. a gray value, may be chosen or calculated which can be used for the data-driven segmentation. The estimation of a region of interest permits a omitting of a part of the data set which leads to improved processing times.

Further, it is possible to derive said information locally. For different areas or regions of the data set of image data different values may be used which allows a more versatile use of the derived information.

It is advantageous to calculate said similarity value from proximities between said approximations and/or differences between orientations of partial faces of said approximations. In areas in which the model obtained by the model-based segmentation and the subset obtained by the data-driven segmentation are close together, i.e. the distance between the surface of the model and the boundary of the subset is small, and/or comprise partial faces which are oriented similarly both approximations may be considered as rather good whereas in areas in which the model and the subset are far apart and/or have partial faces which are oriented differently at least one of the segmentations may have given wrong results which need correction.

According to another embodiment of the image processing device according to the present invention said optimizing means is adapted for adapting said model and/or said subset by re-modeling of said model and/or of a part of said model, excluding a part of said subset from said subset and/or including a part of said data set into said subset. In order to improve the similarity value between the two approximations obtained by the different segmentations it may be necessary to repeat one segmentation or both using information derived from the other approximation. Further, it may be decided upon the similarity value between the two approximations to omit some parts of an approximation. For example, all parts of the subset of image data which have a distance to a surface of the model greater than a given value may be deleted from the subset. This will clear the subset from artifacts and objects in the image data which are no part of the object which is to be segmented.

In a further embodiment of the present invention the image processing device further comprises display means for displaying said multi-dimensional model, said multi-dimensional subset, said similarity value, said adapted model, said adapted subset and/or said derived information; user input means for reading a correction input from a user; and correction means for correcting and/or altering said model-based segmentation, said data-driven segmentation, said model, said subset, said calculation of said similarity value, said optimization of said similarity value, said adapted model, said adapted subset, said derivation of said information and/or said derived information according to said correction input. The display of important data related to the segmentations allows a user to decide on corrections or improvements to the segmentations and to effect them by changing the data which is used for the segmentations or which is obtained from the segmentations via the input means.

In yet another embodiment the image processing device includes gap detecting means for detecting gaps in said multi-dimensional subset and completion means for closing of detected gaps in said subset. It is possible that the subset of image data includes gaps, i.e. regions in which there should be a closed and continuous boundary. Such gaps could be caused by an incorrect segmentation or by a subsequent optimization in which parts of the subset are deleted because there was a large distance to the surface of the model. If these gaps are closed—for example by interpolation of the surrounding subset—one obtains a subset of image data which gives a better approximation of the image object.

In a preferred embodiment of the image processing device said completion means is adapted for using closing information derived from said multi-dimensional model, in particular topological closing information. There are many possible ways to close such a gap, for example by including a plane, a convex or a concave boundary. The model includes information on the expected shape of the object, it is therefore possible and advantageous to close the gaps with a filling which corresponds to the respective area of the model, for example to include a convex filling if the gap corresponds to a part of the model which is convex. Of course, more complex filling structures are also possible, too.

In another preferred embodiment the image processing device comprises display means for displaying said multi-dimensional model, said multi-dimensional subset, said similarity value, said adapted model, said adapted subset and/or said derived information and user input means for reading a selecting input from a user, wherein said selecting means is adapted for selecting said adapted model or said adapted subset according to said selecting input. Thus, a user can select either the adapted model or the adapted subset as the final segmentation of the image object.

The image processing device of another embodiment comprises calculation means for calculating a transformation relation between said model and a predetermined reference model and deformation means for deforming said adapted subset by applying said transformation relation to said adapted subset. By said model-based segmentation a model is adapted to the present data set of image data by—for example—changing of positions of vertices of a mesh. This change of positions is equivalent to a transformation of a starting model to the model which represents a first approximation of the image object. If this transformation is also applied to the adapted subset the obtained transformed adapted subset may be compared to a reference subset or a reference model in order to map corresponding details, for example anatomical details, to each other. This permits an easier classification of anatomical variations and may also help designing new reference or starting models.

The invention will now be explained in more detail with reference to the drawings in which FIG. 1 shows an iso-surface triangulation of the blood-pool form an MSCT image sub-volume;

Figure 1:
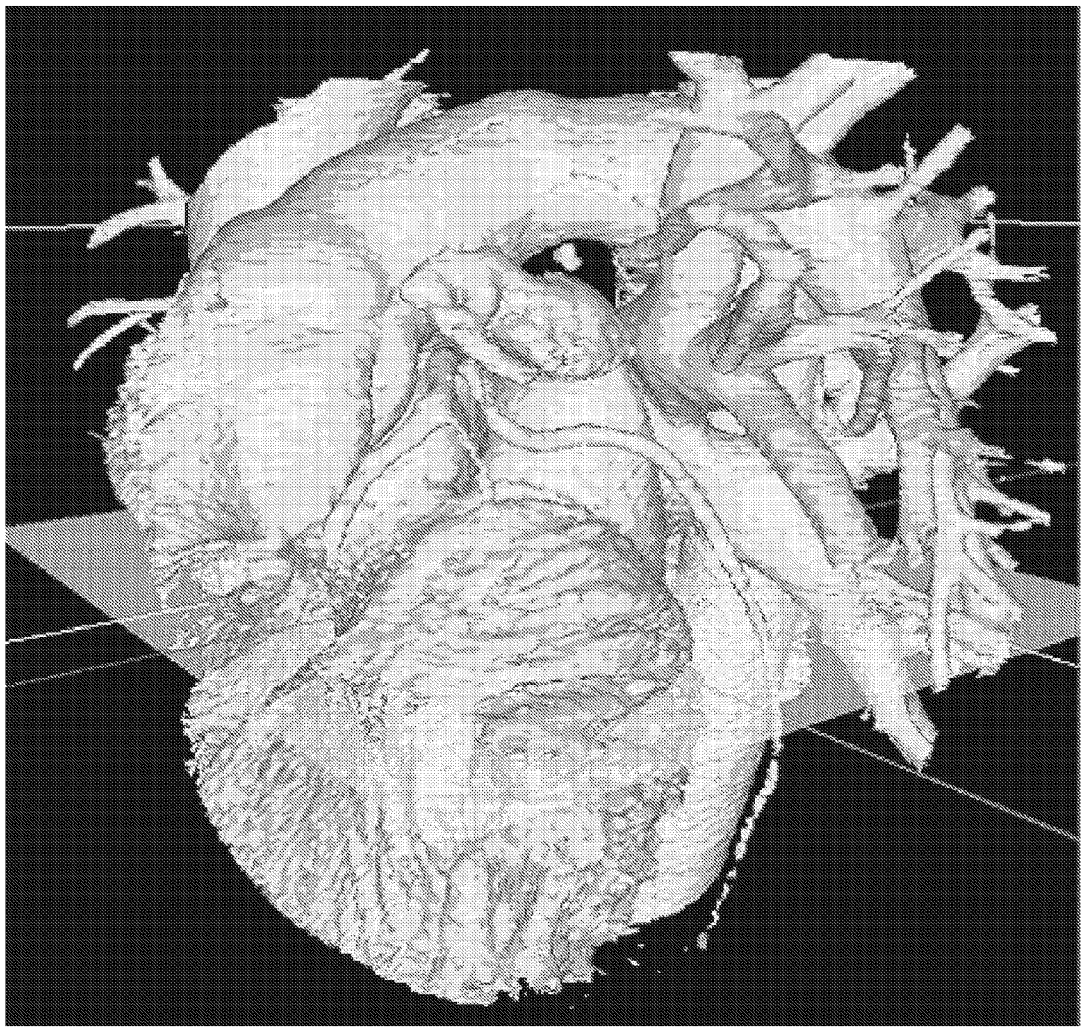

FIG. 1 shows an iso-surface triangulation of the blood-pool from an MSCT image sub-volume. This iso-surface triangulation has been segmented by the application of a threshold for the Hounsfield values. The resolution which can be achieved may be as fine as the voxel spacing, which is about 0.5 mm in cardiac MSCT images. As can be seen from FIG. 1 not only the object of interest, the atrium in this case, but also nearby structures which are also above the Hounsfield threshold are included in this subset of image data. In the center of FIG. 1 the left auricula is clearly visible, below it the coronaries, also both left pulmonary vein branches and the left branch of pulmonary arteries.

In the following procedures for an exemplary model-based segmentation and an exemplary data-driven segmentation are described.

Figure 2A:
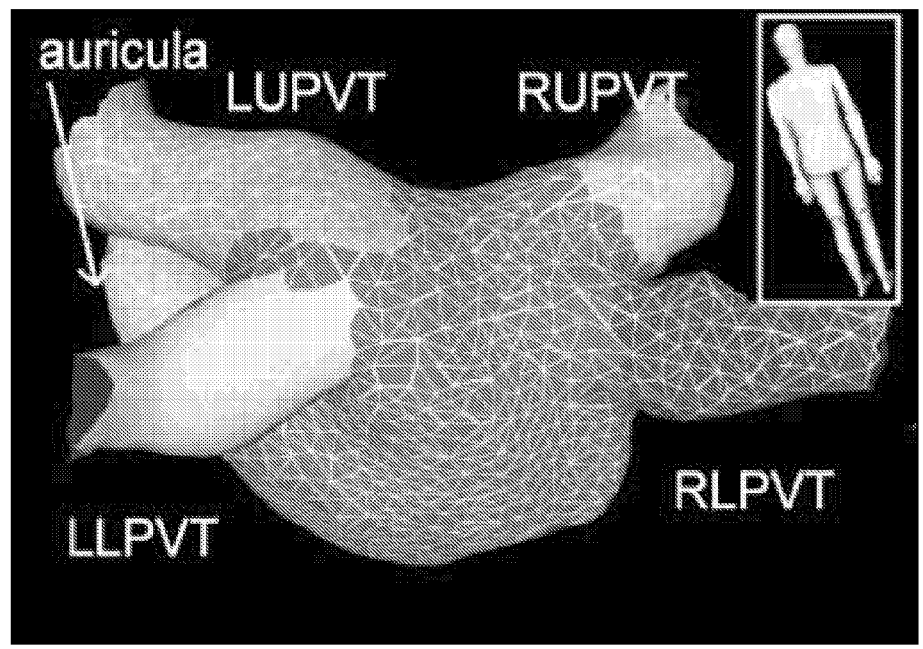
FIG. 2a shows a left atrium surface model with anatomical labels.

If no accurately manually segmented data is available for the model building, a bootstrap approach for consecutive model building and refinement may be followed. For a dedicated sample image the basic cardiac structures of interest (the atrium body, the atrial appendage (atrial auricula), the left upper pulmonary vein trunk (LUPVT), the left lower PVT, the right upper PVT, and the right lower PVT) were fitted with triangular surface models starting from geometric primitives (spheres and tubes) using the methods explained below. A combined surface model $a_0$ having about $V=2500$ vertices $v_{0,i}$ and $T=4800$ triangles $t_{0,i}$ was generated from them where each triangle $t_{0,i}$ is attached a label 4. The resulting surface model is shown in FIG. 2a. The combination of the fitted primitives to a single connected surface is achieved by a method taken from J. von Berg, C. Lorenz. Multi-surface cardiac modelling, segmentation, and tracking. Functional Imaging and Modeling of the Heart, 3rd International Workshop 2005, submitted.

Figure 10:
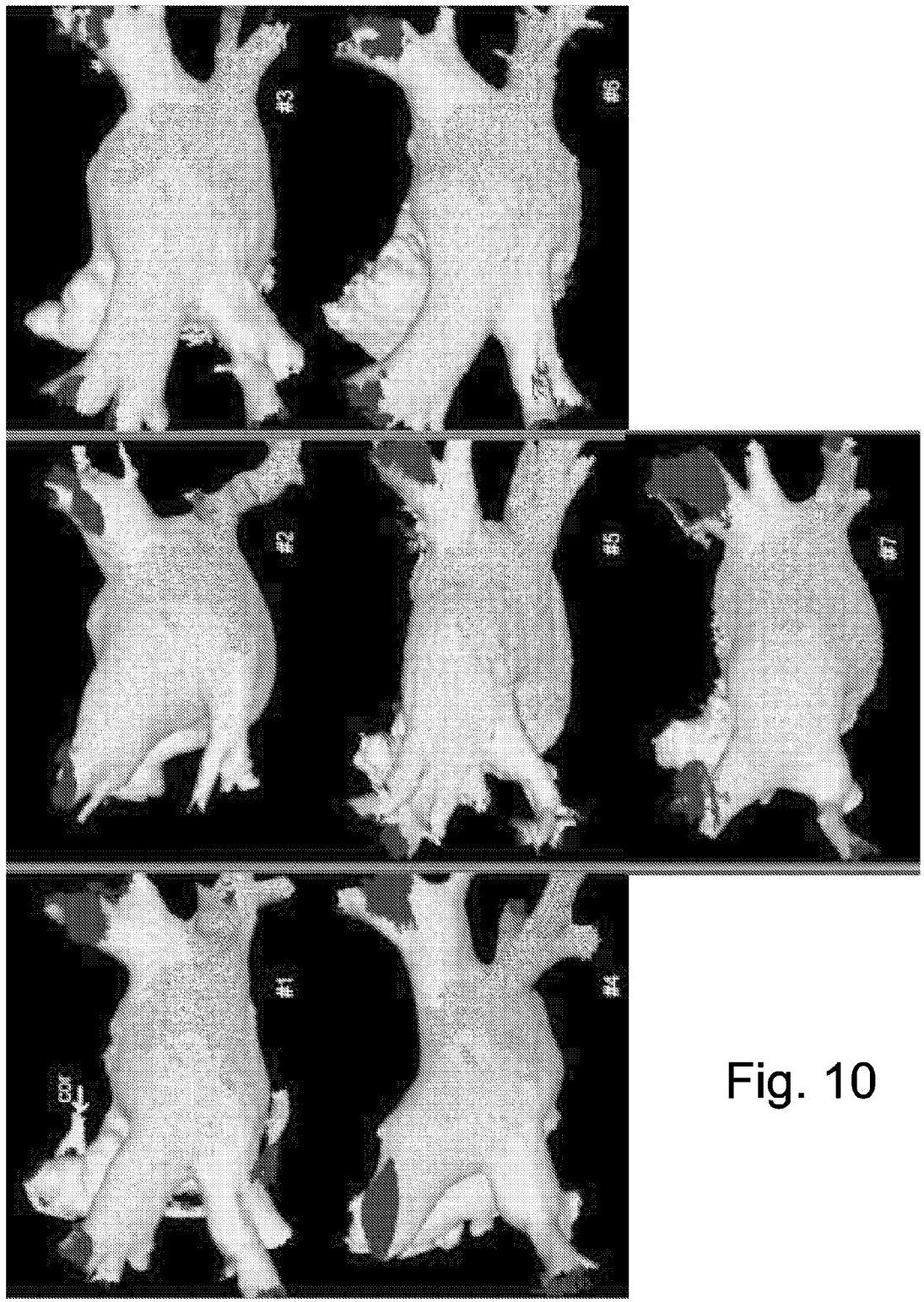
FIG. 10 shows labeled surfaces of the left atrium with pulmonary vein trunks and auricula of seven patients.

The vertices $v_0$ of this model $a_0$ were adapted to a set of $N=7$ further training images (cf. FIG. 10). As only the vertex positions are changed by the fitting, it may be denoted as $A_n:v_0 \to v_n$, $n=1 \ldots N$ yielding the corresponding triangles $t_n$.

$A_n$ may be subdivided into three single transformations $A_n=D_nAP_n$. $P_n$ (pose) has a translation, rotation, and anisotropic scaling component and was approximated interactively until $P_nv_0$ visually agreed well with the image. A is an automatically performed free form deformation as explained below. In some cases, additional local deformations $D_n$ were required performed with a method described in H. Timinger, V. Pekar, J. von Berg, K. Dietmeyer, M. Kaus. Integration of interactive corrections to model-based segmentation algorithms. In: Proc. Bildverarbeitung fuer die Medizin 11-15, 2003. A mean surface model $\bar{v}$ was calculated in the co-ordinate system of $v_0$ by $$\bar{v}_j = \frac{1}{N} \sum_{n=1}^{N} T_n v_{n,j}. \tag{1}$$

The similarity transformation $T_n:v_n \to v_0$ (rigid transformation plus isotropic scaling, given in a homogeneous co-ordinate system) was estimated for each image based on the distance vectors between all corresponding vertices (cf. G. Golub, C. van Loan. Matrix computation $3^{rd}$ edition. John's Hopkins University Press, Baltimore USA, 1996).

Figure 2B:
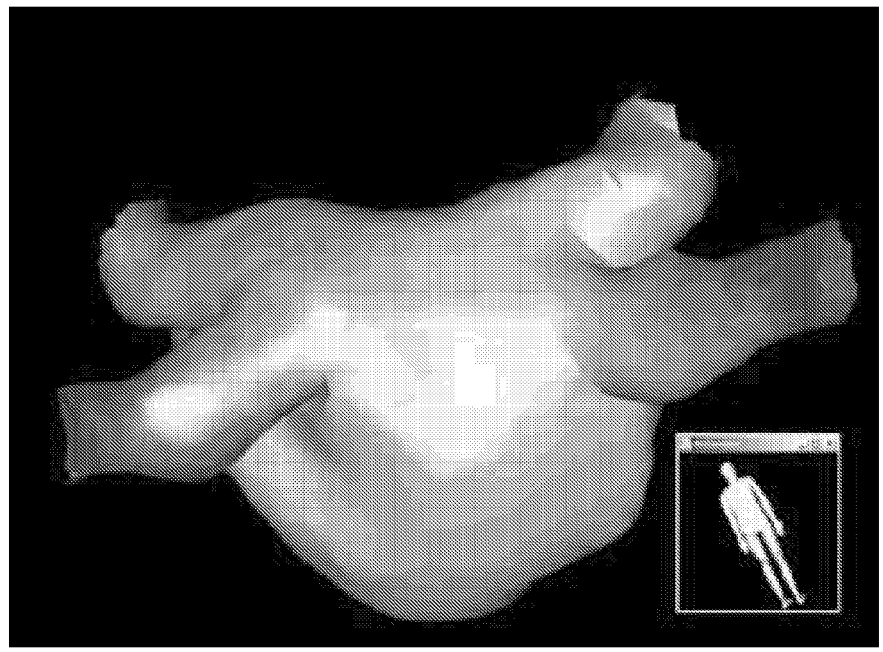
FIG. 2b shows the surface model of FIG. 2a averaged over a number of sample objects.

For a leave-one-out test, also a set of dedicated mean models $$\bar{v}'_{m,j} = \frac{1}{N-1} \sum_{n=1}^{N, n \neq m} T_n v_{n,j} \tag{2}$$

were generated. Each $\bar{v}'_m$ holds shape knowledge of all other samples but sample m itself. This mean model is however ideally positioned in the image by use of prior knowledge. A second, fully automatic fitting $A^A:\bar{v}'_m \to v^*_m$ was performed yielding the fitted model $a^*_m$ with its vertices $v^*_m$ and triangles $t^*_m$. Similar to (1) a mean model $\bar{v}^*$ was calculated in a common co-ordinate system with the similarity transformation $T^*_n:v^*_n \to v^*_1$. This mean model is shown in FIG. 2b.

The automatic free form shape deformation $A:v^0 \to v^n$ from the previous sections uses an iterative shape-based deformable model method (cf. T. McInerney, D. Terzopoulos. Deformable models in medical image analysis: A survey. Medical Image Analysis 1(2), 91-108, 1996; or J. Weese, M. Kaus, C. Lorenz, S. Lobregt, R. Truyen, V. Pekar. Shape constrained deformable models for 3D medical image segmentation. In: Proc. IPMI, 380-387, 2001). Each iteration is performed by minimisation of the energy term $$E = E_{ext} + \alpha E_{int} \tag{3}$$

The internal energy $E_{int}$ maintains consistency of the deformable surface with the initial configuration $v^0$ by $$E_{int} = \sum_{j \in V} \sum_{k \in N(j)} (R(v_j^0 - v_k^0) - (v_j^n - v_k^n))^2 \tag{4}$$

where $N(j)$ gives the indices of all vertices that are neighbors of $v_j$. R is a similarity transformation matrix that is determined by a closed-form point-based registration method prior to the energy calculation to make the energy calculation invariant to pose and scaling.

The external energy is given by $$E_{ext} = \sum_{i=1}^{T} w_i (e_{\nabla I} (\tilde{c}_i - c_i))^2, \; w_i = \max\{0, F_i(\tilde{c}_i) - D \cdot (\tilde{c}_i - c_i)^2\} \tag{5}$$

where $e_{\nabla I}$ is the unit vector in the direction of the image gradient at the triangle barycentre $c_i$. The parameter D controls the trade-off between feature strength and distance. $\tilde{c}_i$ is the best feature point for $c_i$ in the image. It is determined by $$\tilde{c}_i = c_i + n_i \delta \underset{j=-l,\ldots,l}{\operatorname{argmax}} \{F_i(c_i + n_i \delta j)\} \tag{6}$$

where l is the maximum search distance along the triangle normal $n_i$ and $\delta$ is the search step size. The feature function $$F_i(x) = \begin{cases} -n_i^T \nabla I(x) \frac{g_{max}(g_{max} + \|\nabla I(x)\|)}{g_{max}^2 + \|\nabla I(x)\|^2} : & I_{min} < I(x) < I_{max} \\ 0 : & \text{otherwise} \end{cases} \tag{7}$$

damps the influence of the gradient strength beyond $g_{max}$ and restricts search to regions of a given grey value range. More details about this automatic shape deformation method can be found in J. Weese, M. Kaus, C. Lorenz, S. Lobregt, R. Truyen, V. Pekar. Shape constrained deformable models for 3D medical image segmentation. In: Proc. IPMI, 380-387, 2001 or M. R. Kaus, J. von Berg, J. Weese, W. Niessen, V. Pekar. Automated segmentation of the left ventricle in cardiac MRI. Med. 1 mg. Anal. 8 245-254, 2004. The parameter setting was $$g_{max} = 130 \frac{HU}{mm}, \delta = 1 \text{ mm}, l = 10,$$
$$D = 1, I_{min} = -200 HU, I_{max} = 400 HU.$$

The used sample images were acquired at different hospitals, but all with Philips MX8000 IDT 16-line scanners. They were contrast enhanced as they were acquired for the purpose of coronary artery assessment on patients with cardiac complaints. The threshold value was automatically set to the average Hounsfield value of the fitted surface model given by $$\theta_n = \frac{1}{T} \sum_{i=1}^{T} I(c^*_{n,i}) \tag{8}$$

where $c^*_{n,i}$ is the triangle centre of the fitted model $a^*_n$ described above. The thresholding was applied to the whole image volume. In order to speed up the procedure the image was sub-sampled by a factor of two. The surface of the inner voxels (above threshold) was triangulated with the method from W. E. Lorensen, H. E. Cline. Marching Cubes: A high resolution 3D surface reconstruction algorithm. In: Proc. SIGGRAPH 163-169, 1987 resulting in a mesh of triangles $i_n$ for each image. For the noisier images a median filter ($3^3$ voxels in size) previously applied to the image volume makes the resulting iso-surface appear smoother and slightly reduces its area.

Figure 3:
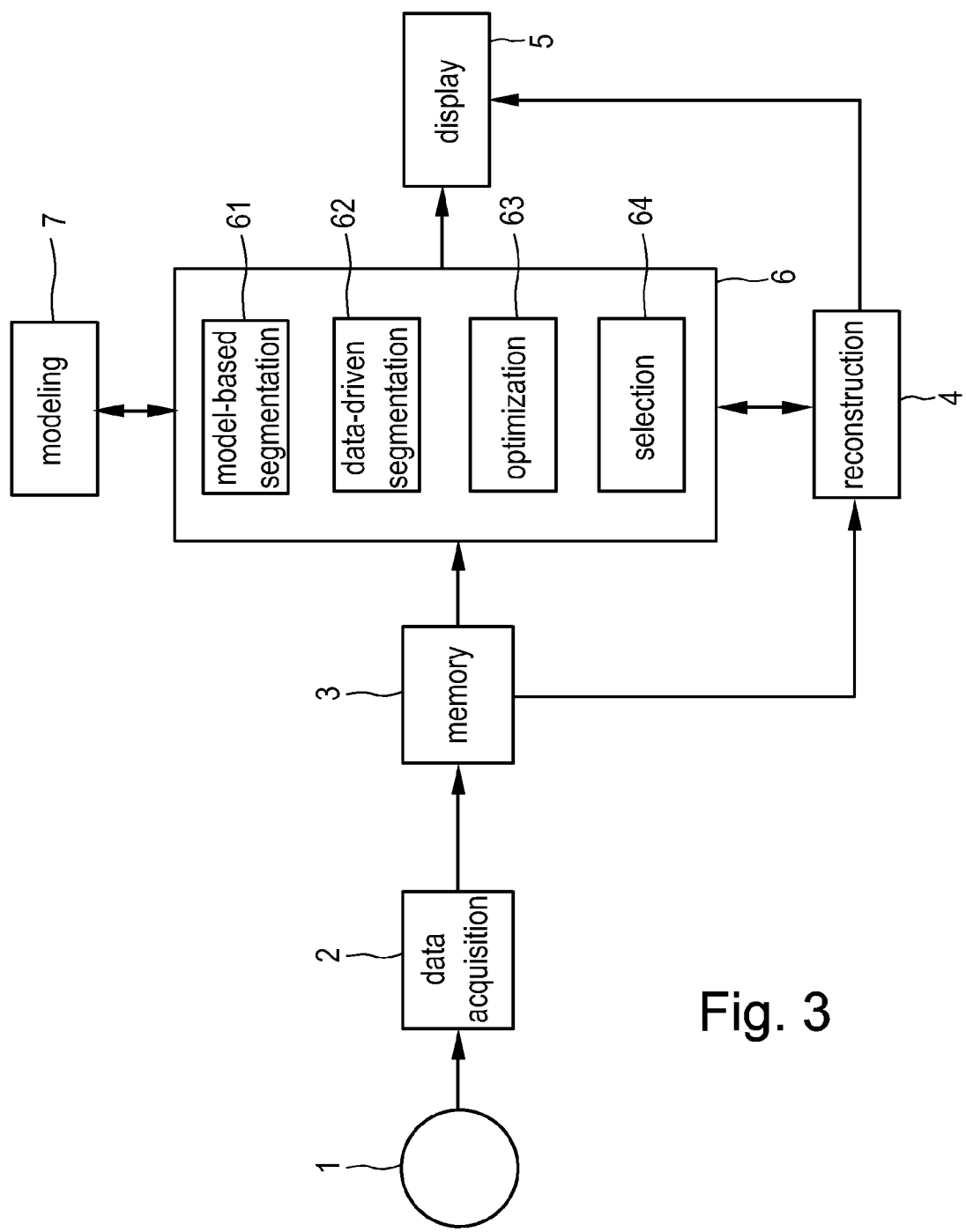
FIG. 3 shows a schematic block diagram of a first embodiment of an image processing device according to the present invention.

The block diagram of the image processing device according to the invention illustrated in FIG. 3 schematically shows an object 1, for instance a patient, from which image data, in particular volume image data, can be acquired by a data acquisition unit 2, which can generally be any medical imaging device, such as a computer tomograph, a magnetic resonance imaging unit, an X-ray device or an ultrasound unit. The acquired data are generally stored in a memory 3, such as a hard disc of a workstation or a server in a medical computer network. Generally an image processing device includes a reconstruction unit 4 for reconstructing images from the acquired image data for display on a display means 5. Furthermore, for segmentation of an (target) object in the image data a segmentation unit 6 is provided.

The segmentation unit 6 comprises a model-based segmentation means 61 which provides a model-based segmentation of the acquired data set stored in the memory 3. A model-based segmentation utilizes a priori knowledge on structures of the image data in the data set, for example the knowledge that an object like a atrium commonly has a special, characteristic shape and size. There may be aberrances or anomalies or even a range of possible variations which have to be included into the modeling. In order to permit a training of the model using well segmented training image sets and an improvement of the information and knowledge used for the model-based segmentation a modeling unit 7 is included into the image processing device.

A number of suitable model-based segmentation methods is commonly known including mesh-based segmentation and functional-approximation-based segmentation and there is no need for a further description of the model-based segmentation as such herein (cf. Model-Based Recognition Methods for LV Modeling, Section 3.4 in: Suri, Setarehdan, Singh (Eds.) Advanced Algorithmic Approaches to Medical Image Segmentation, Springer 2002).

Further, a data-driven segmentation means 62 is provided for a data-driven segmentation of the acquired data set stored in the memory 3. An example of such a data-driven segmentation method is a method applying a threshold for the Hounsfield values and a subsequent iso-surface triangulation as described above. It is not necessary to perform such a triangulation since there are other suitable known methods to permit a comparison between a model representing an image object and a data subset representing the same object. The surfaces of the object may also be approximated by any other mathematical means that allows for a similarity measure. Spherical harmonics are used for this purpose or spline-based approximations. Both allow for a distance measure between two such surfaces.

Again, it has to be noted that the term "subset" used herein is not limited to a subset of the data set of image data in a literal sense but also includes other representations of the image object or of such a subset which are obtained by a data-driven segmentation.

The segmentation unit 6 further comprises an optimization means 63 for an optimization of a similarity value between the two approximations of the image object obtained by the model-based segmentation means 61 and the data-driven segmentation means 62. Either the model or the subset representing these approximations or both of them are adapted or changed in order to obtain a better similarity. It is preferred to adapt the subset.

Also, a selection means 64 is comprised by the segmentation unit 6 which selects either the (adapted) model or the (adapted) subset as the final segmentation of the image object which will be outputted by the segmentation unit 6. This selection may be a predetermined one, as for example always the adapted subset is selected as the final representation of the image object. In this case the model will preferably remain unchanged during the processing of the optimization means 63. The selection may also be based on properties of the model and the subset as for example the amount of data which is necessary to store or display the model or subset or the extent of adapting of either of them during the optimization.

Figure 4:
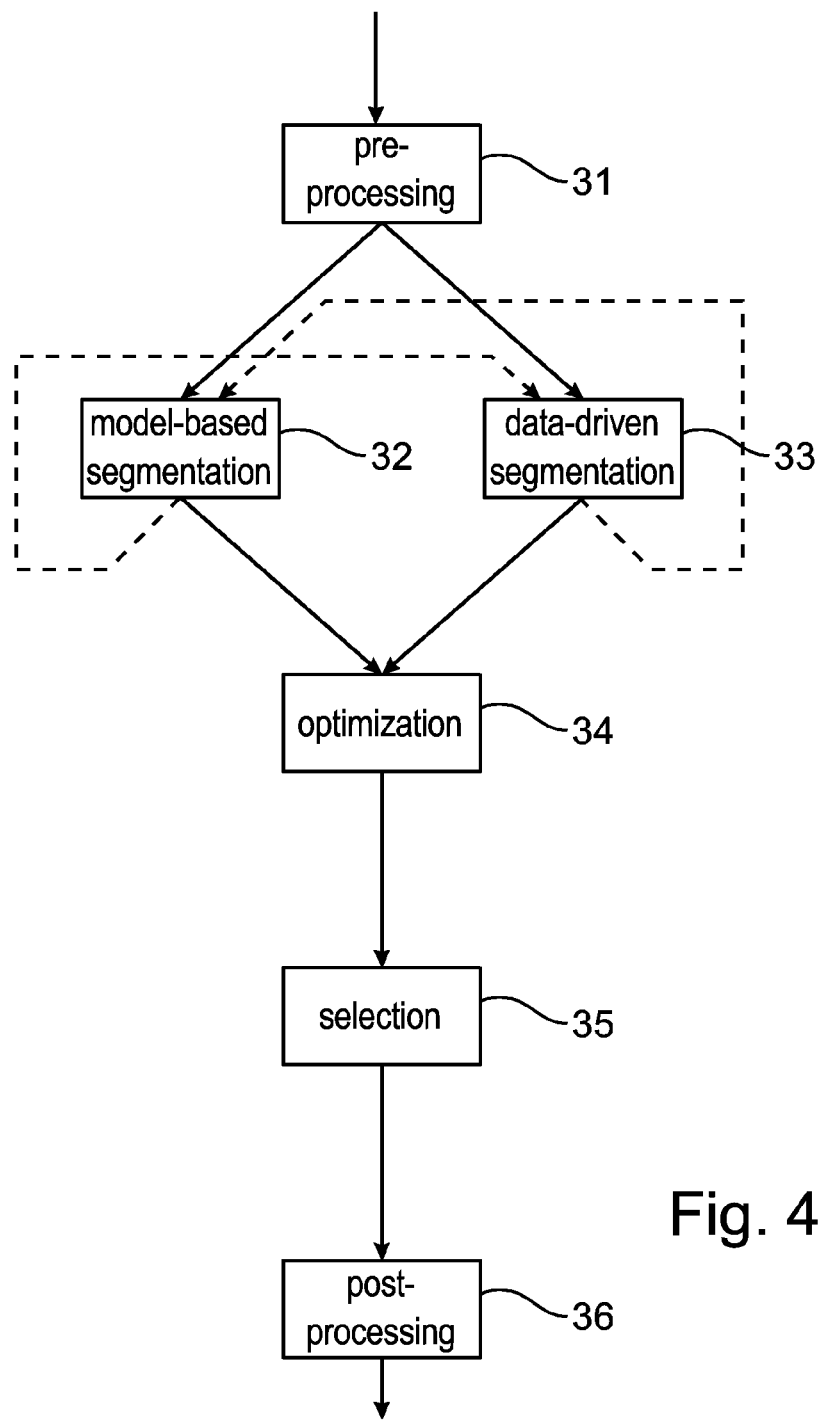
FIG. 4 shows a flow process chart illustrating the operation of the embodiment shown in FIG. 3 and a first embodiment of an image processing method according to the present invention.

FIG. 4 shows a flow process chart illustrating the operation of the embodiment shown in FIG. 3 and a first embodiment of an image processing method according to the present invention. After a step of pre-processing 31 which may include model training, data acquisition, data improvement (e.g. applying of filters or data compression) and other steps which may be necessary or beneficial to the image processing a model-based segmentation 32 and a data-driven-segmentation 33 are preformed. The steps 32 and 33 may be performed simultaneously or sequentially. According to a preferred embodiment a model-based segmentation 32 of the image data is done wherein information is derived form the result of the model-based segmentation and used for or during the data-driven segmentation 33. An example of such a deriving of information is the calculation of a threshold value for the data-driven segmentation form the data set of image data and the model representing a first approximation of the image object. It is also possible to perform the data-driven segmentation 33 prior to the model-based segmentation 32 wherein—for example—the obtained subset may be used to estimate orientation, position and size of the image object to be segmented and to use this estimations during the model-based segmentation. Further, a sequence comprising a plurality of segmentations may performed wherein information derived from results of a model-based segmentation are used for a data-driven segmentation and vice versa.

When both, model and subset, are obtained from the segmentation steps 32 and 33, the two approximations are compared by calculating a similarity value and adaptations are applied to model, subset or model and subset in order to optimize said similarity value during an optimization step 34 after which one adapted approximation, i.e. model or subset, is selected in a selection step 35. After the selection step 35 a post-processing step 36 follows which may include storing of the subset and/or the model, storing of additional information, displaying or outputting the results of the segmentation and other steps of a image processing method.

Figure 5:
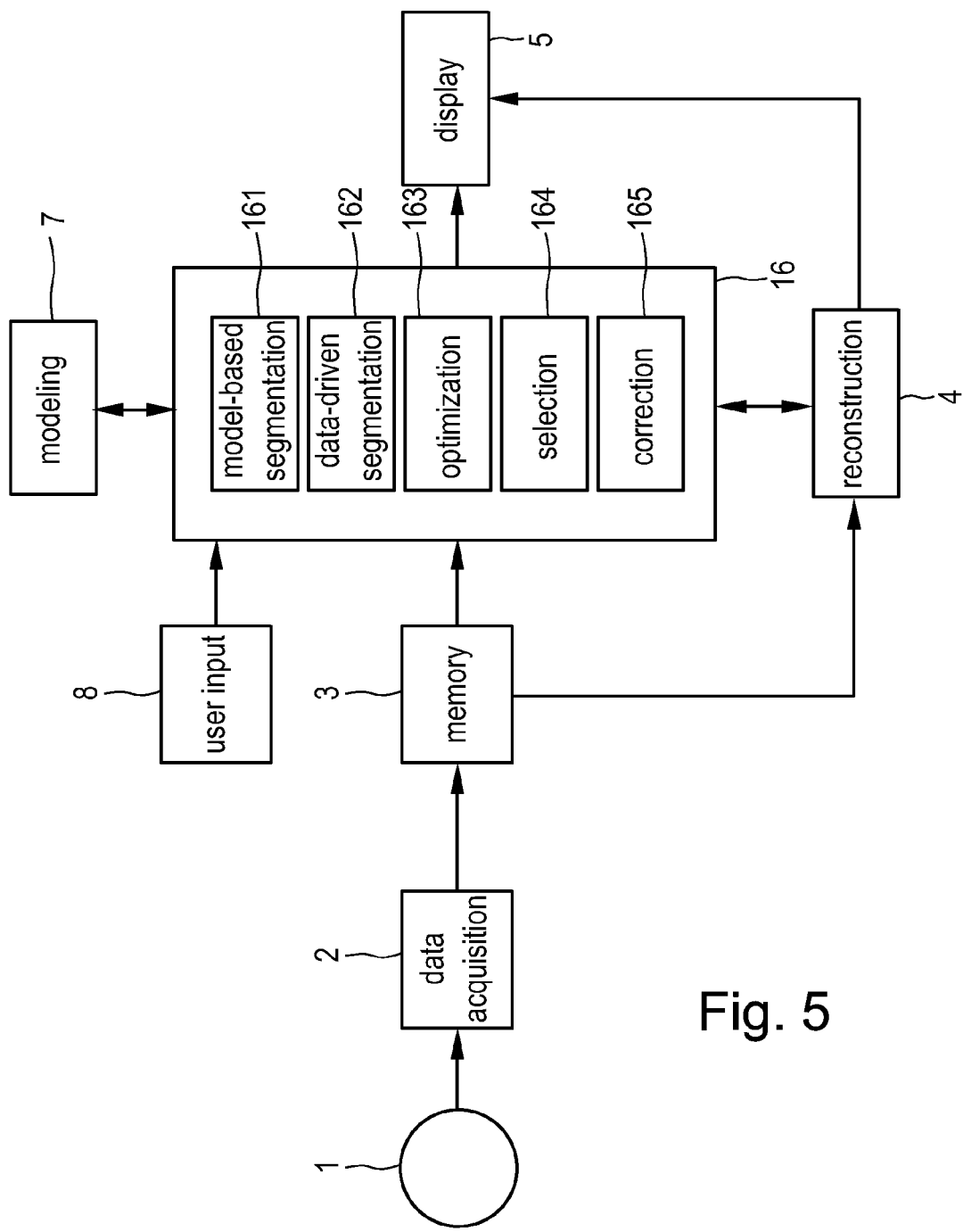
FIG. 5 shows a schematic block diagram of a second embodiment of an image processing device according to the present invention.

A schematic block diagram of a second embodiment of an image processing device according to the present invention is shown in FIG. 5. This embodiment corresponds to the embodiment shown in FIG. 3 but comprises further elements. User input means 8 are provided so that a user can input data in response to a display of (intermediary) results of the segmentation of the image data by display means 5. A segmentation unit 16 of the image processing device comprises model-based segmentation means 161, data-driven segmentation means 162, optimizing means 163 and selecting means 164 similar to the segmentation unit 6 of the embodiment shown in FIG. 3. Further, the segmentation unit 16 comprises a correction means 165 for modifying the methods and/or results of the segmentation according to the user input given via the input means 8. The input means 8 may further be utilized for inputting a selecting input according to which the selecting means 164 selects an adapted approximation of the image object as a final segmentation.

Figure 6:
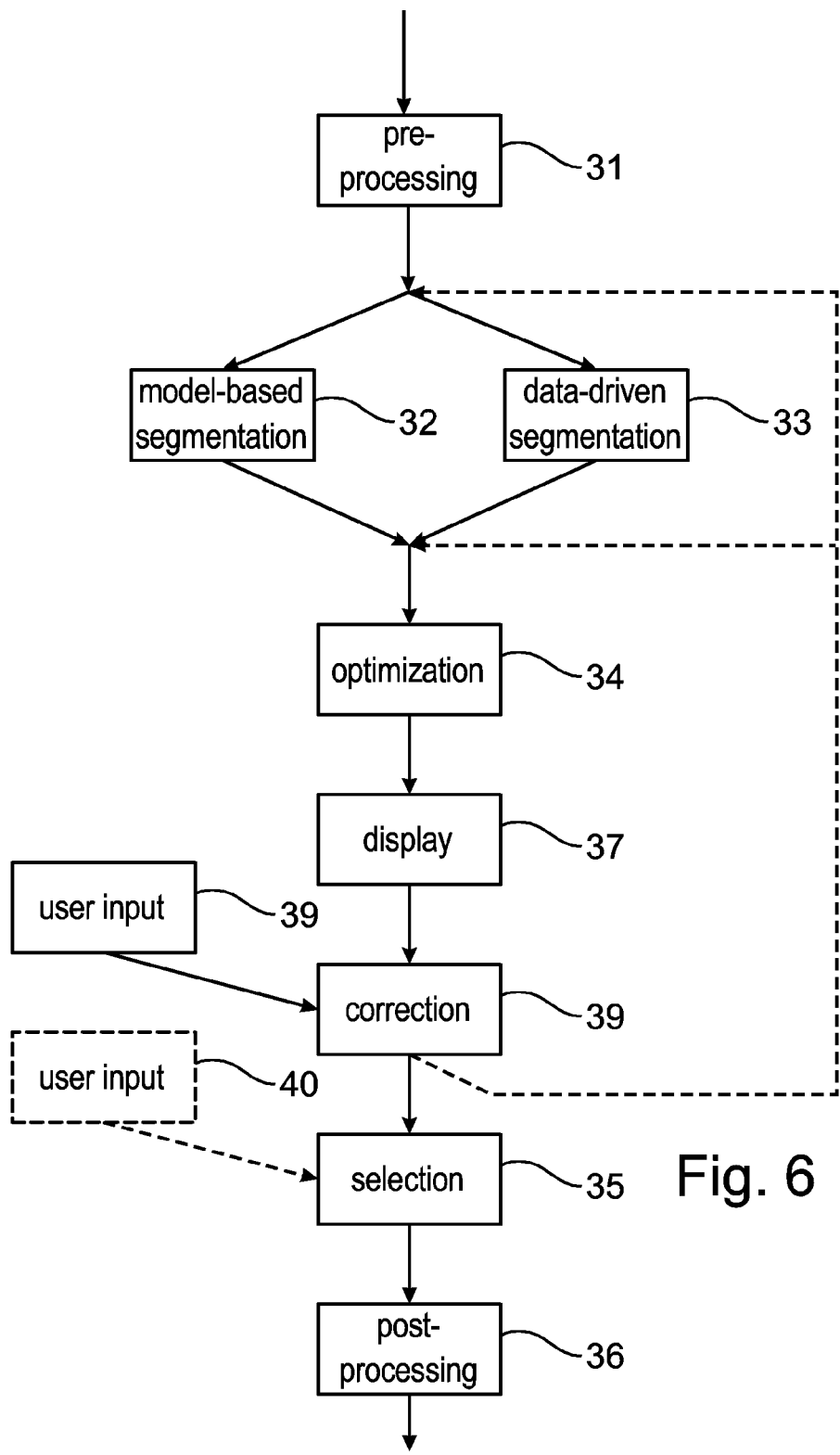
FIG. 6 shows a flow process chart illustrating the operation of the embodiment shown in FIG. 5 and a second embodiment of an image processing method according to the present invention.

A flow process chart in FIG. 6 illustrates the operation of the embodiment shown in FIG. 5 and a second embodiment of an image processing method according to the present invention. The operation and method are similar to the operation and method shown in FIG. 4. After a pre-processing step 31a a model-based segmentation 32 and a data-driven-segmentation 33 are performed. The results of the steps 32 and 33 are processed during an optimizing step 34 during which a similarity value is optimized and the results obtained by the model-based segmentation 32 and the data-driven segmentation 33 are adapted. The adapted results are displayed (step 37), so a user can perform a user input 38 as a response to said displaying 36. According to the user input 38 a correction 39 is performed which may induce a re-do of the process starting at a point prior to the display 36. Further, the display 36 allows a user to select one of the representations of the image object as the final segmentation. A corresponding user input 40 causes the selection 35 of the final segmentation which is followed by a post-processing 36.

Figure 7:
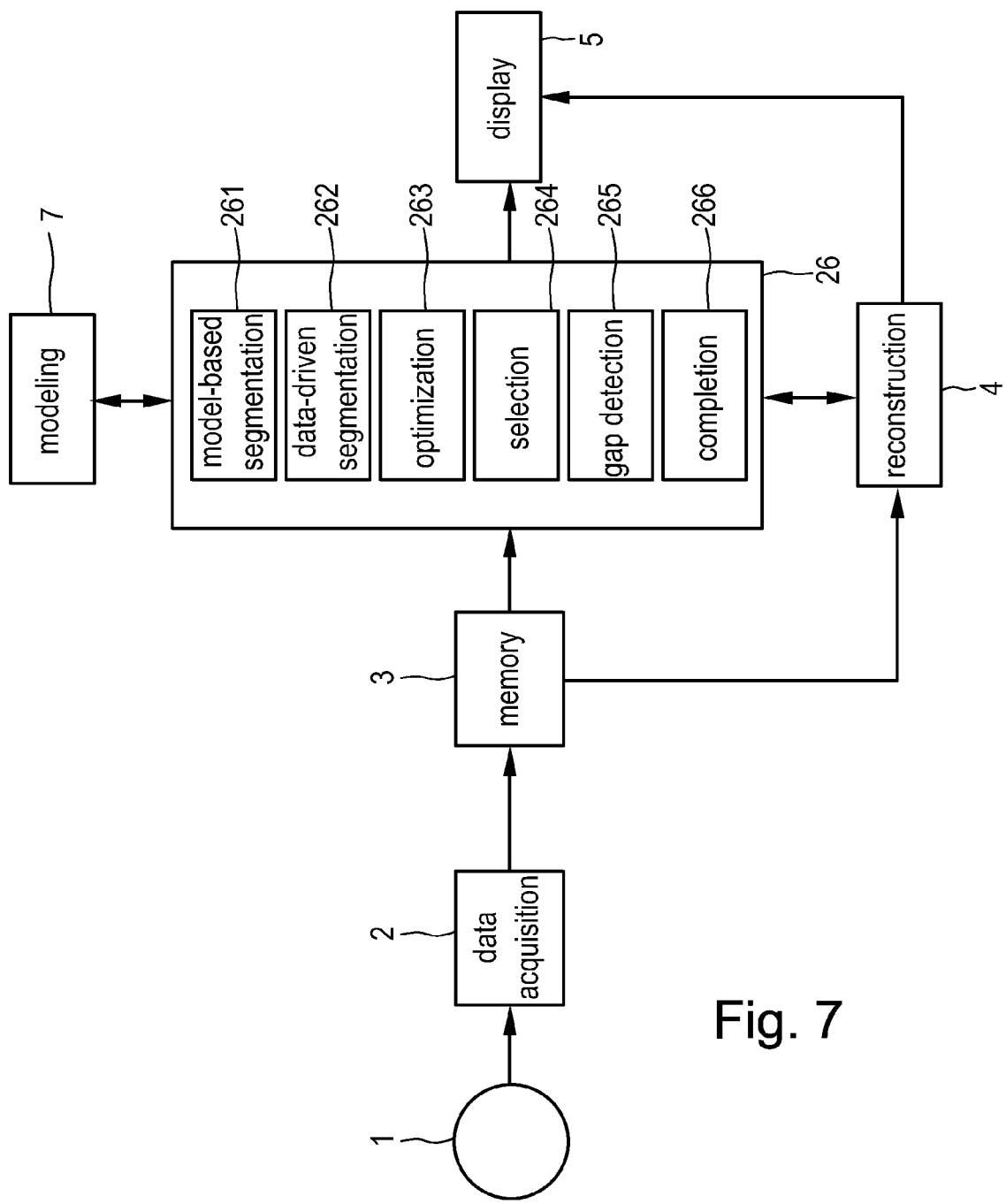
FIG. 7 shows a schematic block diagram of a third embodiment of an image processing device according to the present invention.

In FIG. 7 a schematic block diagram of a third embodiment of an image processing device according to the present invention is shown which comprises elements corresponding to the elements of the embodiment shown in FIG. 3. As shown in FIG. 3 for segmentation unit 6, the segmentation unit 26 of the image processing device comprises means for a model-based segmentation, for a data-driven segmentation, for an optimization and a selection 261 to 264. In addition, the segmentation unit 26 includes gap detection means 265 and completion means 266. Depending on the used data-driven segmentation method and the optimization there may be gaps in the subset representing an approximation of the image object. These gaps may—for example—result from artifacts and disturbing elements in the image data or from an exclusion of a part of the subset during an optimization. The gap detections means 265 detects these gaps and localizes thus areas which have to be filled in order to obtain a subset of the image data which represents a closed surface. The detected gaps are closed by the completion means 266 which for this purpose may utilize information derived the model, in particular topological information. Even without such topological information a completion is possible, for example by an interpolation of the regions of the subset surrounding gap.

Figure 8:
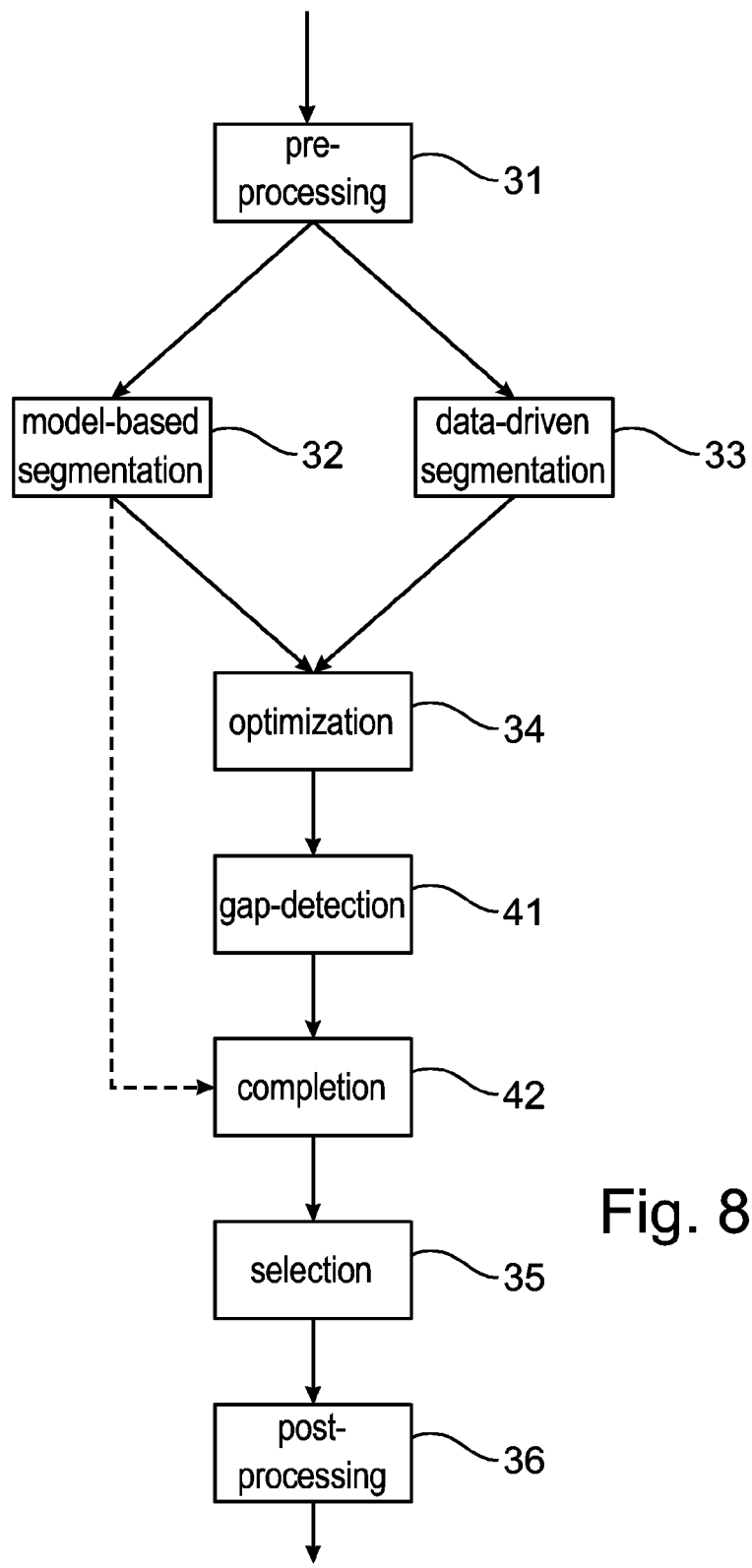
FIG. 8 shows a flow process chart illustrating the operation of the embodiment shown in FIG. 7 and a third embodiment of an image processing method according to the present invention.

The operation of the embodiment shown in FIG. 7 and a third embodiment of an image processing method according to the present invention are illustrated by the flow process chart shown in FIG. 8. Similar to FIG. 6 FIG. 8 shows again steps of flow process chart shown in FIG. 4. A model-based segmentation 32 and a data-driven segmentation 33 are performed after a pre-processing step 31 and the results obtained thereby are optimized during an optimizing step 34 followed by a step of gap detection 41. The gap detection finds regions of the subset of image data in which the surface or boundary is interrupted. Methods for this gap detection as well as methods for the closing of gaps are well known and will therefore not further described here in detail.

Information which can be derived from a model-based segmentation may additionally be used for detecting and closing of gaps in the surface of an object represented by the subset of image data. Once the gaps are closed, a final segmentation is selected during a selecting step 35 from the adapted model and subset. A post-processing step 36 follows.

In the following, a selection and labeling of iso-surface faces is described being a part of the optimization step 34. If the results of both, model-based segmentation and data-driven segmentation, i.e. model and subset, are represented by a triangular mesh they can easily be compared and a similarity value can be calculated as follows.

For the selection of those iso-surface faces $i_n^a$ from $i_n$ that are sufficiently similar in location and orientation with at least one model face, and thus are assumed to belong to the modelled structure, the following criterion was applied:

$$i_n^a = \{i_{n,i} : \exists j | d(i_{n,i}, t_{n,j}) < \epsilon\}. \quad (9)$$

The distance measure was $$d(i_{n,j}, t_i) = \|c_{n,j}^i - c_{n,i}^t\| + \omega \arccos\left|\frac{n_{n,j}^i \cdot n_{n,i}^t}{|n_{n,j}^i| \cdot |n_{n,i}^t|}\right|, \quad (10)$$

where $c_{n,j}^i$ means the barycentre of iso-surface triangle $i_{n,j}$ and $n_{n,j}^i$ means its normal. The same holds for $c_{n,i}^t$ and $n_{n,i}^t$ for the triangle face $t^*_{n,i}$ in model $a^*_n$. The anatomical label $$l_{n,j}^i = l_k, k = \operatorname{argmin}_i(d(n_{i,i}, t_{n,j})) \quad (11)$$

was assigned to $i_{n,j}^a$. From the resulting iso-surface $i_n^a$ only the largest connected component $i_n^i$ was taken, which excludes some surface patches of other nearby structures.

Figure 9A:
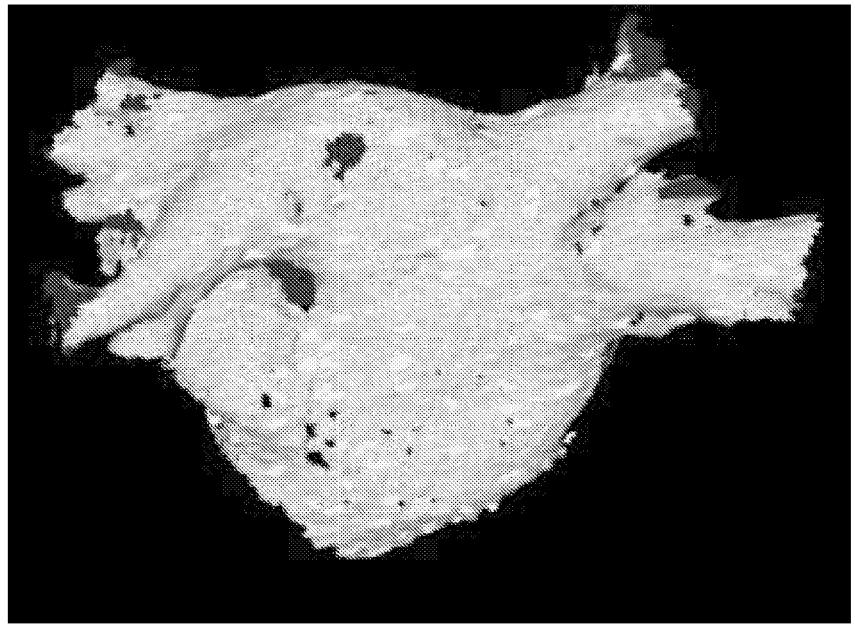
FIGS. 9a, 9b show an iso-surface with a two different strict distance measures.
Figure 9B:
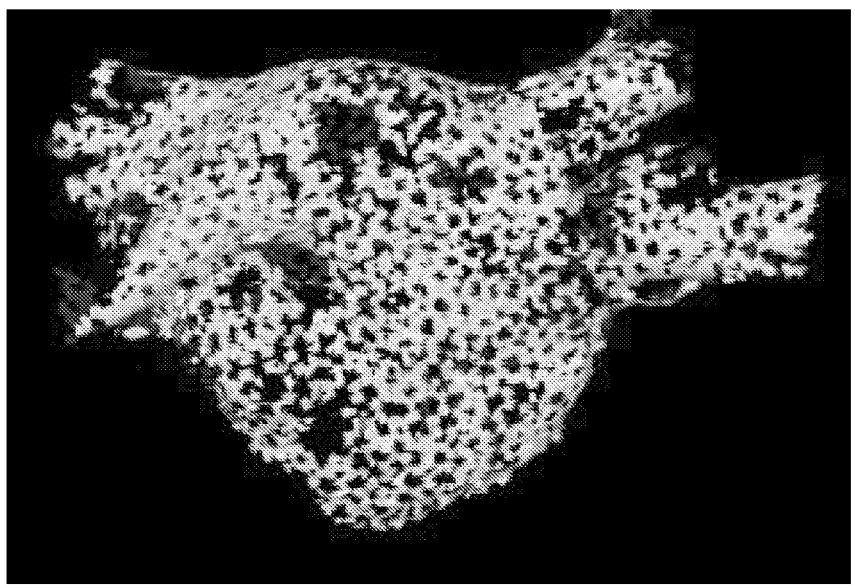

Results from an implementation of the invention using seven sample data sets of image data may be summarized as follows:

With about 15s time the automatic fitting of a model is comparably fast. Taking the iso-surface triangulation as comparison data, the method described above in regard of the distance measure can be applied to also assess the model-based segmentation results $a^*_n$. Constructing $i_n^a$ with parameters of a very strict distance criterion (e.g. $\omega=0$ mm and $\epsilon=2$ mm) yields the part of the iso-surface that is within this distance range from the model surface. FIGS. 9a and 9b shows the results for $\epsilon=2$ mm (FIG. 9a) and $\epsilon=1$ mm (FIG. 9b) (always $\omega=0$ mm) for image #5 of FIG. 10. It follows that the predominant part of the iso-surface is closer than 2 mm to at least one of the model triangle centers in Cartesian co-ordinates, and a large part is even closer than 1 mm. Compared to the other six images, this one turned out to have a rather bad accuracy. FIG. 9b clearly illustrates how an adaptation of the subset by excluding parts which are too far apart from the model surface can produce holes or gaps in the boundary of the subset.

Figure 11A:
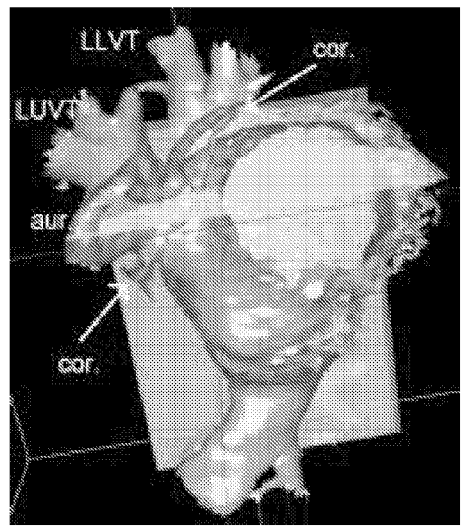
FIGS. 11a, 11b show two segmentations of image #1 of FIG. 10.
Figure 11B:
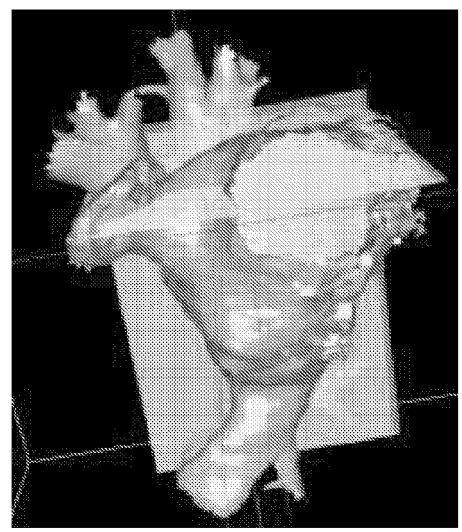
Figure 11C:
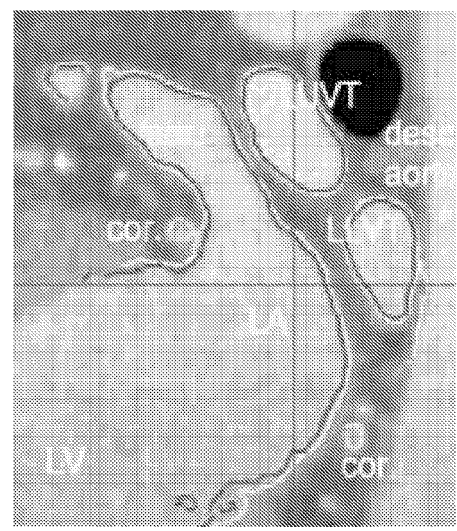
FIG. 11c shows the sagittal cut-plane form the segmentations of FIGS. 11a, 11b.

The mean Hounsfield value of the adapted model surface $\theta_n$ differed for the images due to different procedures and timing of contrast medium donation. It ranged between 74 HU and 229 HU (average for all seven images: 134 HU, standard deviation within image was 131 HU on average). The iso-surface triangulation of the whole image volume yielded between 0.7 and 8.9 million faces per image at a sampling grid of 2×2×2 voxels. This procedure takes about 10s on a common 2.6 GHz PC. FIG. 10 shows the resulting surfaces $i_n^a$ of the adapted subsets with anatomic labels. For these images the parameters were set to $\omega=5$ mm and $\epsilon=12$ mm (for comparison: the lateral extent of the left atrium body is about 75 mm). This setting proved to include all relevant structures, but excludes most distracting structures. For three of the examined seven images (#1, #5, #6) a fraction of the coronaries below the left auricula was included into the surface, because its iso-surface happens to be connected with that of the auricula. This could be avoided by choosing a higher threshold like $\theta_n+50$HU. FIGS. 11a to 11c shows both variants applied to image #1 for comparison.

FIG. 11a shows a segmentation of image #1 using $\theta_1$ wherein included coronary fractions are coming close to the auricula. When a value of $\theta_1+50$ HU is applied instead (FIG. 11b), the surface slightly shrinks and the coronaries are now disconnected from the left atrium. FIG. 11c shows the sagittal cut-plane from previous images with both iso-surfaces (light: $\theta_1$, dark: $\theta_1+50$HU).

Figure 13A:
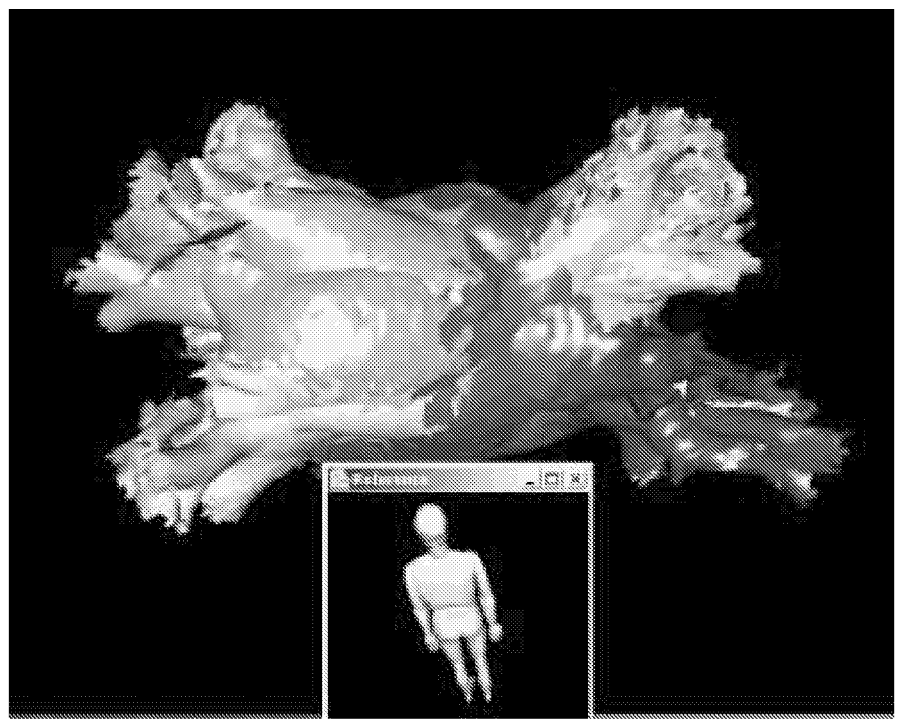
FIGS. 13a, 13b show an overlay of the labeled and co-registered surfaces of the images of FIG. 10 from two different perspectives.

Making the distance criterion corresponding to a similarity value more loose will include coronaries or arterial structures (especially the right pulmonary artery close to the RUVT and the descending aorta). Also the blood of left ventricle and the ascending aorta will be partially included then. Making the criterion more strict reduces the extent of distal branches of the vein trunks and of the auricula. Reducing it too much will produce holes (see FIG. 9b). Due to the similarity transformations acquired for the model, also these surfaces could be co-registered with each other by applying $T^*_n{}^{-1}$ to it. This allows for an overlay of all labelled surface $T^*_n{}^{-1} i_n^i$ shown in FIGS. 13a and 13b. A mean iso-surface $\bar{i}^1$ cannot be calculated similarly to $\bar{v}$ and $\bar{v}^*$, because there does not exist a direct correspondence between vertices.

$v_0$ appeared to model the largest atrium in the image set. The isotropic scaling parameter of $T^*_n$ for all remaining seven images was $0.89\pm0.08$, which gives a measure of size variation in the sample.

Figure 12A:
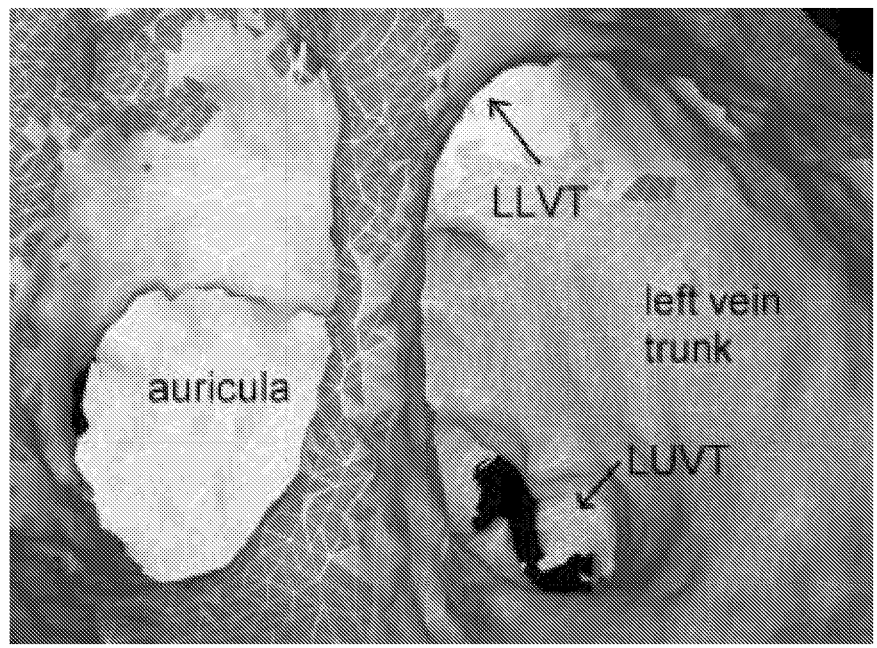
FIGS. 12a, 12b show two renderings of two patients' surfaces from inside the atrium with a co-registered perspective.
Figure 12B:
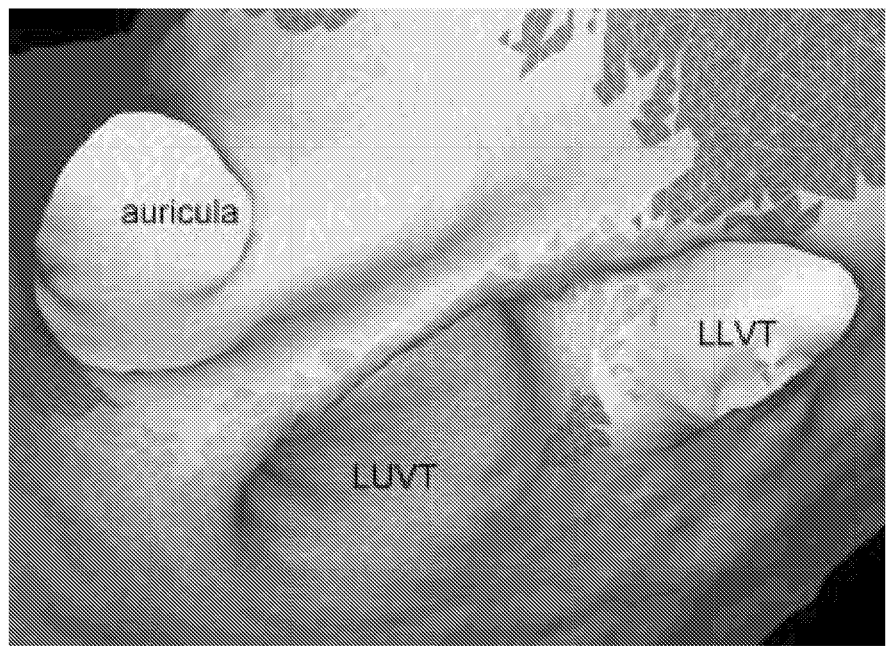

The variability of the pulmonary drainage patterns is remarkably high. In the classification scheme proposed in E. M. Marom, J. E. Herndon, Y. H. Kim, H. P. McAdams. Variations in pulmonary venous drainage to the left atrium: Implications for radiofrequency ablation. Radiology 230(3), 824-829, 2004 only 86% of all examined patients had a normal left pulmonary vein pattern (two ostia), and 71% had a normal right pulmonary vein pattern. In our present sample there were three of seven subjects (#5, #6, #7) with a single left ostium that splits up into LUVT and LLVT more than one centimeter distal from the ostium (classified as exceptional type L1b by Marom et al.). FIGS. 12a and 12b give a rendering from inside the atrium for one of them. Rendering of two patients' surfaces from inside the atrium with a co-registered perspective. FIG. 12a shows a common left pulmonary vein trunk that splits up distally into upper and lower trunk wherein FIG. 12b shows two distinct ostia (common type).

Figure 13B:
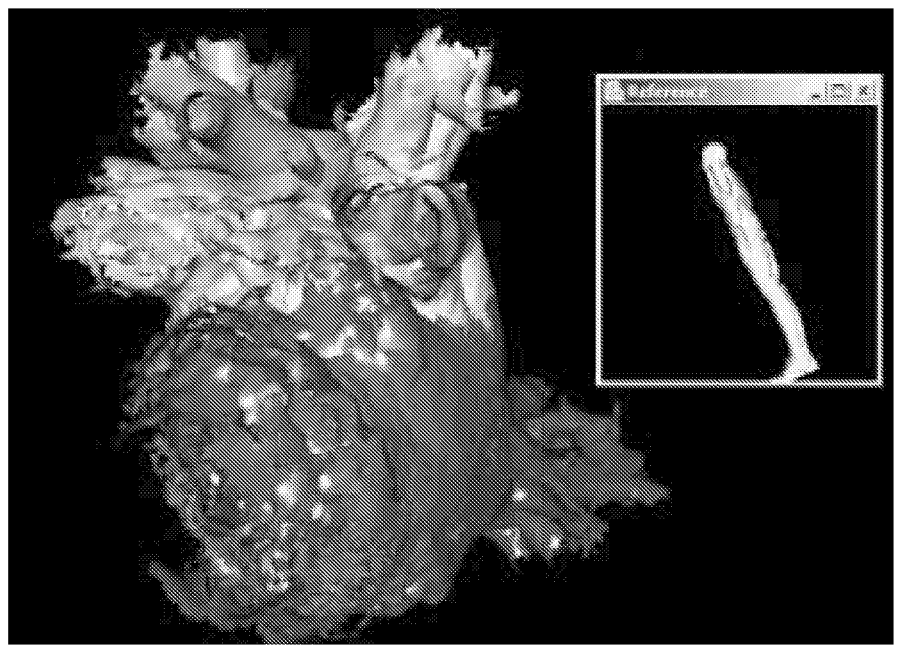
Figure 14A:
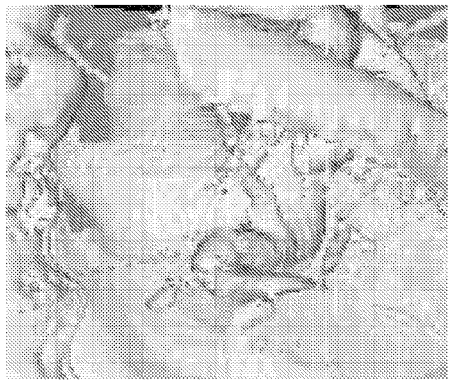
FIG. 14a shows a rendering of the iso-surface of a cardiac MSCT image including a left atrium.
Figure 14C:
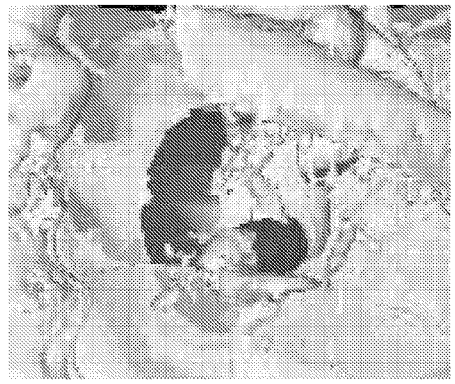
FIG. 14c shows an overlay of the FIGS. 14a and 14b.
Figure 14B:
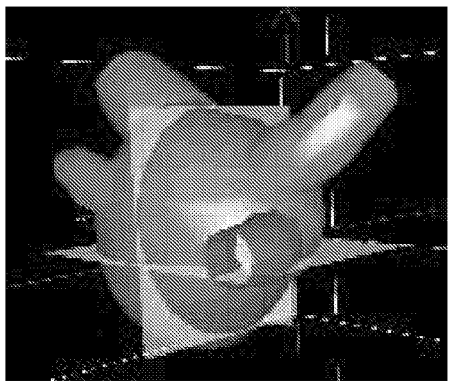
FIG. 14b shows a model of the left atrium.
Figure 14D:
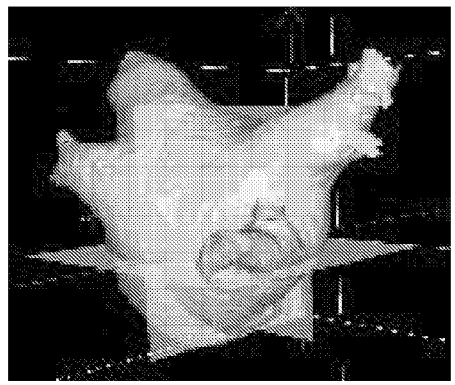
FIG. 14d shows a segmentation of the left atrium according to the present invention.

The deformable surface model $\bar{v}'_{m,j}$ was however able to adapt also to these images properly in the leave-one-out test, because there is no topological difference between both variants. Thus, the method succeeded in segmenting and labeling of the four main pulmonary vein trunks in all cases despite the observed anatomical variability. As FIGS. 13 and 13b show, the variability in the present small sample is such that once the surface models are co-registered, all five attached entities (the four main venous trunks as well as the auricula) are spatially separated from each other.

A shape model was built for the left atrium from seven multi slice computed tomography images by semi-automatic fitting of an initial deformable surface. The four main pulmonary vein trunks as well as the auricula were separately labelled in this surface model. This model was applied for automatic fitting to the images and labeling of the named anatomical sub-regions in a leave-one-out test. It reached an accuracy of about 1 mm. The mean Hounsfield value of the fitted model surface was then used for an iso-surface triangulation of each image. The results of these two complementary segmentation approaches were then combined with each other by selecting only those iso-surface triangles that are close to the fitted model. The final result was a fine representation of the left atrial surface for each image. A co-registration of the different atrial surfaces was possible by the similarity transformations estimated for their models. Also anatomical labels could be transferred from the model to the iso-surface. Once a surface model like $\bar{v}$ is available, the procedure works automatically and yields a representation for a given MSCT image like in FIGS. 11a and 11b in about 1 min time on a common 2.6 GHz PC excluding hard drive access.

Using a model-based approach to select dedicated anatomical structures from the fine and detailed iso-surface turns out to be a suitable means towards more automated presentation of relevant structures only. This may become a prerequisite both for more efficient presentation to a physician for a given dedicated purpose, but also for subsequent procedures in cardiac diagnostics and treatment. A focus was put herein on the left atrium that is gaining more and more attention in the context of image guided atrial defibrillation.

The straight forward iso-surface detection is a powerful means to complement model-based methods with some uncommitted "ground truth". Especially in case of high resolution images of complicated compound structures like the heart it is expensive to get reliable expert reference segmentations for training and verification of model based methods. As the variability of pulmonary drainage patterns beyond the main four proximal trunks is still too high for such a surface model adaptation approach, the combination with the iso-surface allows a visualization of these more distal branches, although there was no explicit model for them. Unlike a pure model based approach, anatomical variations and mis-adaptations become immediately visible in presentations like those in FIG. 10.

Some steps of the segmentation according to the present invention are illustrated in FIG. 14 a to 14d. FIG. 14a shows a rendering of the iso-surface of a cardiac MSCT image including a left atrium which is covered by and confused with other structures like the ribs (top right), spine (left) and lung vessels. FIG. 14b shows a model of the left atrium which is coarsely fitted to the image shown FIG. 14a. FIG. 14c shows an overlay of the FIGS. 14a and 14b and FIG. 14d shows a segmentation of the left atrium according to the present invention wherein the results of the model-based segmentation shown in FIG. 14b and the data-driven segmentation shown in FIG. 14a are combined into a single segmentation of the image object, i.e. of the atrium.

Figure 15:
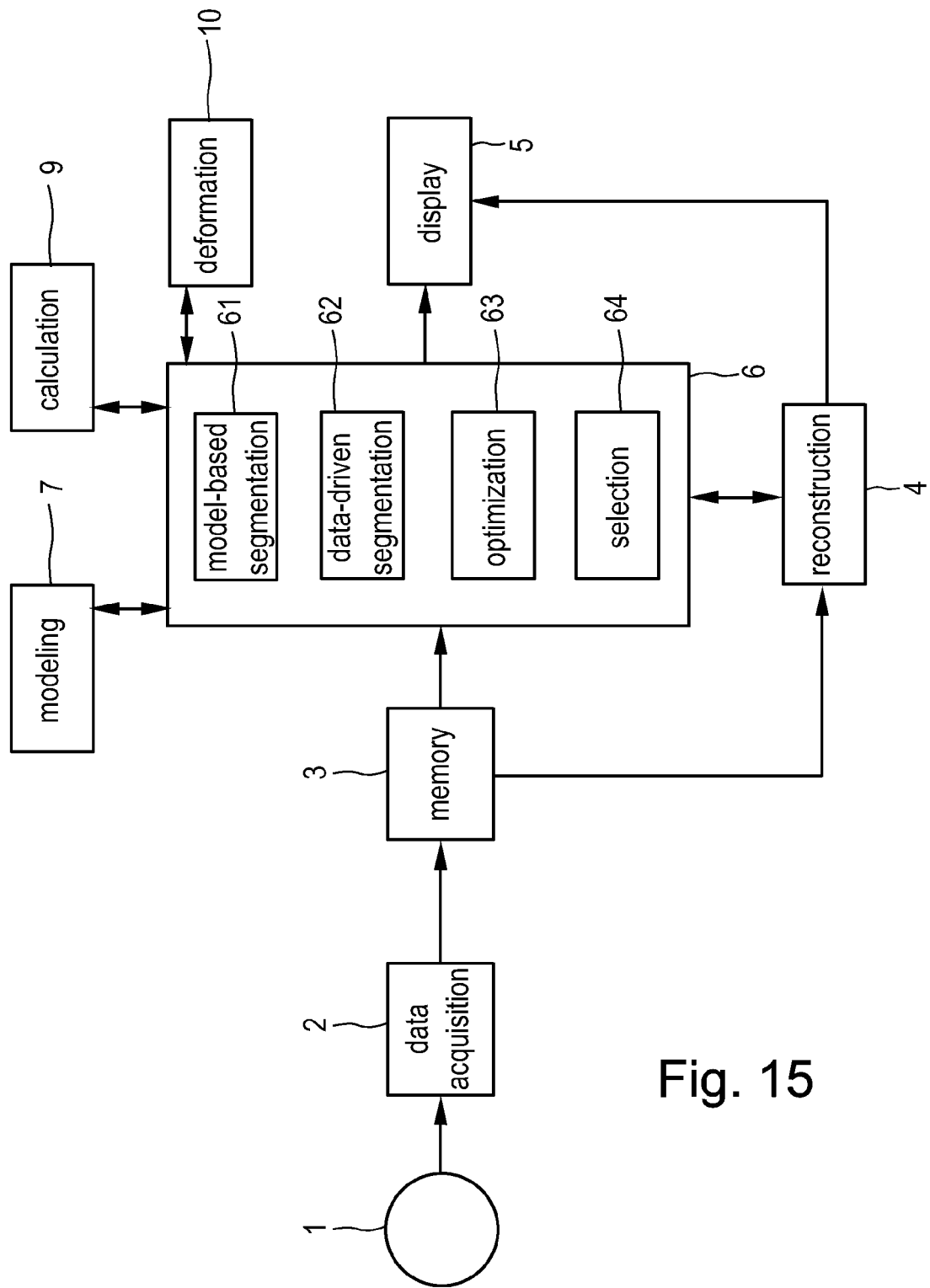
FIG. 15 is an embodiment of the present invention as shown in FIG. 3.

FIG. 15 shows the embodiment of an image processing device according to the present invention shown in FIG. 3 wherein calculation means 9 for calculating a transformation relation and deformation means 10 for deforming a segmentation by applying said transformation relation to said segmentation are added. The starting model which is fitted to data set of image data is compared with the fitted or adjusted model and a transformation is computed which transforms the adjusted or fitted model to the starting model which has the function of a reference model. A corresponding transformation is applied to the segmentation or the adjusted subset of image data which allows a comparison of the structure, the shape or the topology of the segmented image object to those of other data sets of image data, i.e. to other images. For all of the different images the same template of a deformable model may be used having the same number of triangles and the same topology. Thus, a simple correspondence between different results of the model-based segmentation exists. Therefore, a transformation may be calculated or estimated (rigid, affine or free deformation) and applied to the vertices of a iso-surface triangulation in order to map corresponding anatomic details to each other.

Figure 16:
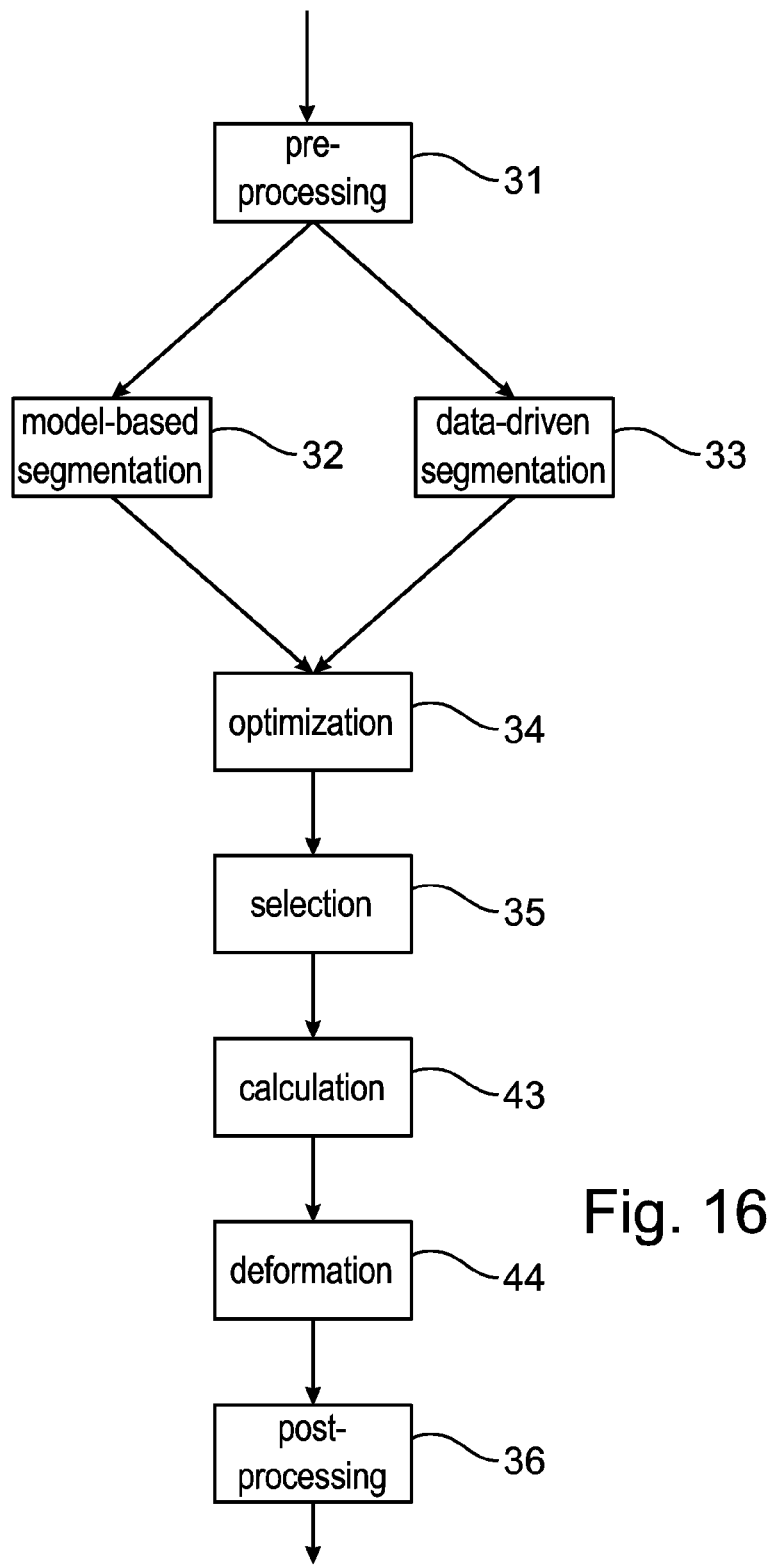
FIG. 16 is an operation flow process chart illustrating the operation of an embodiment of the present invention.

An operation flow process chart similar to the one shown in FIG. 4 is shown in FIG. 16 and illustrates the steps of a calculation 43 of the transformation and of a deformation 44 of a segmentation according to this transformation following the selecting step 35 and preceding the step of post-processing 36.

An image processing device for segmenting a data set of image data and a corresponding image processing method are proposed which give better results in terms of accuracy, reliability and robustness than known devices or methods for segmenting image data. The advantage of a high robustness of model-based segmentations using global information on the image data like general shapes and the advantage of a high accuracy of data-driven segmentations using local information on the image data like pixel- or voxel-values are combined whereas the disadvantages of both segmentations are avoided.

The invention claimed is:

1. Image processing device for processing a multi-dimensional data set of image data, in particular of three-dimensional medical volume image data, including a segmentation unit for a segmentation of an image object in said data set, said segmentation unit comprising:

model-based segmentation means for performing a model-based segmentation of said data set for obtaining a multi-dimensional model representing a first approximation of said image object;

data-driven segmentation means for performing a data-driven segmentation of said multidimensional data set for obtaining a multi-dimensional subset of said multi-dimensional data set representing a second approximation of said image object;

optimizing means for adapting said model and said subset for optimizing a similarity value between said first and said second approximation;

and selecting means for selecting said adapted model or said adapted subset as a segmentation of said image object.

2. Image processing device as claimed in claim 1, wherein said model-based segmentation means is adapted for performing a mesh-based segmentation, a functional-approximation-based segmentation and/or combinations thereof.

3. Image processing device as claimed in claim 1, wherein said data-driven segmentation means is adapted for performing a pixel-based segmentation, a boundary-based segmentation, a region-based segmentation, a texture-based segmentation, a watershed-segmentation and/or combinations thereof.

4. Image processing device as claimed in claim 1, wherein said data-driven segmentation means is adapted for using information derived by said model-based segmentation means from said model-based segmentation in said data-driven segmentation.

5. Image processing device as claimed in claim 4, wherein said information derived from said model-based segmentation includes starting values for said data-driven segmentation, threshold values for said data-driven segmentation and/or a region of interest for selecting a subsection of said data set for which said data-driven segmentation is to be performed.

6. Image processing device as claimed in claim 4, wherein said information is derived locally.

7. Image processing device as claimed in claim 1, wherein said model-based segmentation means is adapted for using information derived by said data-driven segmentation means from said data-driven segmentation in said model-based segmentation.

8. Image processing device as claimed in claim 7, wherein said information derived from said data-driven segmentation includes a region of interest for selecting a subsection of said data set for which said model-based segmentation is to be performed and/or estimations for position, orientation and/or size of said object as starting values for said model-based segmentation.

9. Image processing device as claimed in claim 1, wherein said similarity value is calculated from proximities between said approximations and/or differences between orientations of partial faces of said approximations.

10. Image processing device as claimed in claim 1, wherein said optimizing means is adapted for adapting said model and/or said subset by re-modeling of said model and/or of a part of said model, excluding a part of said subset from said subset and/or including a part of said data set into said subset.

11. Image processing device as claimed in claim 1, further comprising
display means for displaying said multi-dimensional model, said multi-dimensional subset, said similarity value, said adapted model, said adapted subset and/or said derived information;
user input means for reading a correction input from a user; and
correction means for correcting and/or altering said model-based segmentation, said data-driven segmentation, said model, said subset, said calculation of said similarity value, said optimization of said similarity value, said adapted model, said adapted subset, said derivation of said information and/or said derived information according to said correction input.

12. Image processing device as claimed in claim 1, further comprising
gap detecting means for detecting gaps in said multi-dimensional subset; and
completion means for closing of detected gaps in said subset.

13. Image processing device as claimed in claim 12, wherein said completion means is adapted for using closing information derived from said multi-dimensional model, in particular topological closing information.

14. Image processing device as claimed in claim 1, further comprising
display means for displaying said multi-dimensional model, said multi-dimensional subset, said similarity value, said adapted model, said adapted subset and/or said derived information and
user input means for reading a selecting input from a user, wherein said selecting means is adapted for selecting said adapted model or said adapted subset according to said selecting input.

15. Image processing device as claimed in claim 1, further comprising
calculation means calculating a transformation relation between said model and a predetermined reference model; and
deformation means for deforming said adapted subset by applying said transformation relation to said adapted subset.

16. Image processing method for processing a multi-dimensional data set of image data, in particular of three-dimensional medical volume image data, including a segmentation step for a segmentation of an image object in said data set, said segmentation step comprising:
a model-based segmentation step for performing a model-based segmentation of said data set for obtaining a multi-dimensional model representing a first approximation of said image object;
a data-driven segmentation step for performing a data-driven segmentation of said multi-dimensional data set for obtaining a multi-dimensional subset of said multi-dimensional data set representing a second approximation of said image object;
an optimizing step for adapting said model and said subset for optimizing a similarity value between said first and said second approximation;
and a selecting step for selecting said adapted model or said adapted subset as a segmentation of said image object.

17. Computer program stored on non-transitory computer-readable medium comprising program code means for causing a computer to perform the steps of the method as claimed in claim 16, when said computer program is executed on a computer.

* * * * *